United States Patent
Moore

(10) Patent No.: US 10,674,226 B2
(45) Date of Patent: Jun. 2, 2020

(54) VIDEO CONTENT REPLAY

(71) Applicants: Sony Corporation, Tokyo (JP); Sony Europe B.V., Weybridge (GB)

(72) Inventor: Nigel Stuart Moore, Newbury (GB)

(73) Assignees: Sony Corporation, Tokyo (JP); Sony Eurppe B.V., Weybridge (GB)

(*) Notice: Subject to any disclaimer, the term of this patent is extended or adjusted under 35 U.S.C. 154(b) by 0 days.

(21) Appl. No.: 15/559,437

(22) PCT Filed: Mar. 7, 2016

(86) PCT No.: PCT/GB2016/050616
§ 371 (c)(1),
(2) Date: Sep. 19, 2017

(87) PCT Pub. No.: WO2016/156785
PCT Pub. Date: Oct. 6, 2016

(65) Prior Publication Data
US 2018/0091867 A1    Mar. 29, 2018

(30) Foreign Application Priority Data
Mar. 27, 2015 (GB) .................................. 1505326.7

(51) Int. Cl.
*H04N 21/6543* (2011.01)
*H04N 21/437* (2011.01)
(Continued)

(52) U.S. Cl.
CPC ....... *H04N 21/6543* (2013.01); *H04N 21/235* (2013.01); *H04N 21/25858* (2013.01);
(Continued)

(58) Field of Classification Search
None
See application file for complete search history.

(56) References Cited

U.S. PATENT DOCUMENTS 6,526,577 B1 * 2/2003 Knudson ............ H04N 5/44543
348/E5.104
2007/0162852 A1    7/2007 Jung et al.
(Continued)

FOREIGN PATENT DOCUMENTS

| CN | 102647634 A | 8/2012 |
| CN | 103702215 A | 4/2014 |
| CN | 103945240 A | 7/2014 |

OTHER PUBLICATIONS

"Digital Video Broadcasting (DVB); Signalling and carriage of interactive applications and services in Hybrid broadcast/broadband environments," ETSI TS 102 809 V1.1.1 (Jan. 2010) Technical Specification, Jan. 2010, pp. 1-98.
(Continued)

*Primary Examiner* — Michael R Telan
(74) *Attorney, Agent, or Firm* — Oblon, McClelland, Maier & Neustadt, L.L.P.

(57) ABSTRACT

A video content replay apparatus comprises a first video content player operable to playback video content comprising a plurality of images to be displayed at respective display times; load a second video content player in response to the initiation of the playback of the video content by the first video content player; and transfer control of the playback of the video content from the first video content player to a second video content player such that the plurality of images displayed by the second video content player are each displayed at their respective display times as if they had been displayed by the first video content player and the first image of the plurality of images displayed by the second video content player and the last image of the plurality of images displayed by the first video content player are sequential images in the video content.

15 Claims, 9 Drawing Sheets

(51) Int. Cl.
  *H04N 21/44*   (2011.01)
  *H04N 21/472*  (2011.01)
  *H04N 21/434*  (2011.01)
  *H04N 21/258*  (2011.01)
  *H04N 21/435*  (2011.01)
  *H04N 21/235*  (2011.01)
  *H04N 21/443*  (2011.01)

(52) U.S. Cl.
  CPC ......... *H04N 21/435* (2013.01); *H04N 21/437* (2013.01); *H04N 21/4345* (2013.01); *H04N 21/443* (2013.01); *H04N 21/44004* (2013.01); *H04N 21/44008* (2013.01); *H04N 21/47202* (2013.01); *H04N 21/47217* (2013.01)

(56) References Cited

U.S. PATENT DOCUMENTS

| | | | | |
|---|---|---|---|---|
| 2009/0043869 | A1* | 2/2009 | Hansen | H04N 7/17318 709/219 |
| 2009/0046545 | A1* | 2/2009 | Blinnikka | G11B 27/105 369/30.06 |
| 2009/0328124 | A1 | 12/2009 | Khouzam et al. | |
| 2012/0124123 | A1 | 5/2012 | Pierce et al. | |
| 2013/0074131 | A1* | 3/2013 | Cerveau | H04N 21/2387 725/88 |
| 2013/0091297 | A1* | 4/2013 | Minder | H04N 21/23439 709/231 |
| 2013/0117792 | A1 | 5/2013 | Khouzam et al. | |
| 2013/0167168 | A1* | 6/2013 | Ellis | H04N 5/44543 725/12 |
| 2014/0096166 | A1* | 4/2014 | Gordon | H04N 21/44004 725/86 |
| 2014/0201800 | A1 | 7/2014 | Kitahara et al. | |
| 2015/0036734 | A1 | 2/2015 | Hendry et al. | |
| 2015/0363060 | A1* | 12/2015 | Gaunt | G06F 3/0484 715/716 |

OTHER PUBLICATIONS

International Search Report dated Jun. 21, 2016 in PCT/GB2016/050616 filed Mar. 7, 2016.

\* cited by examiner

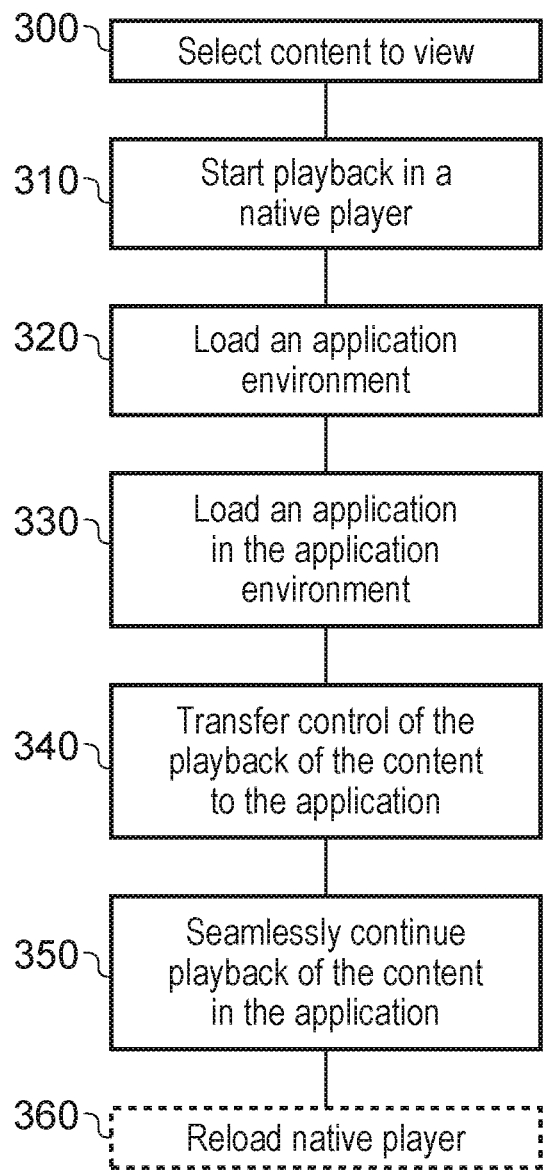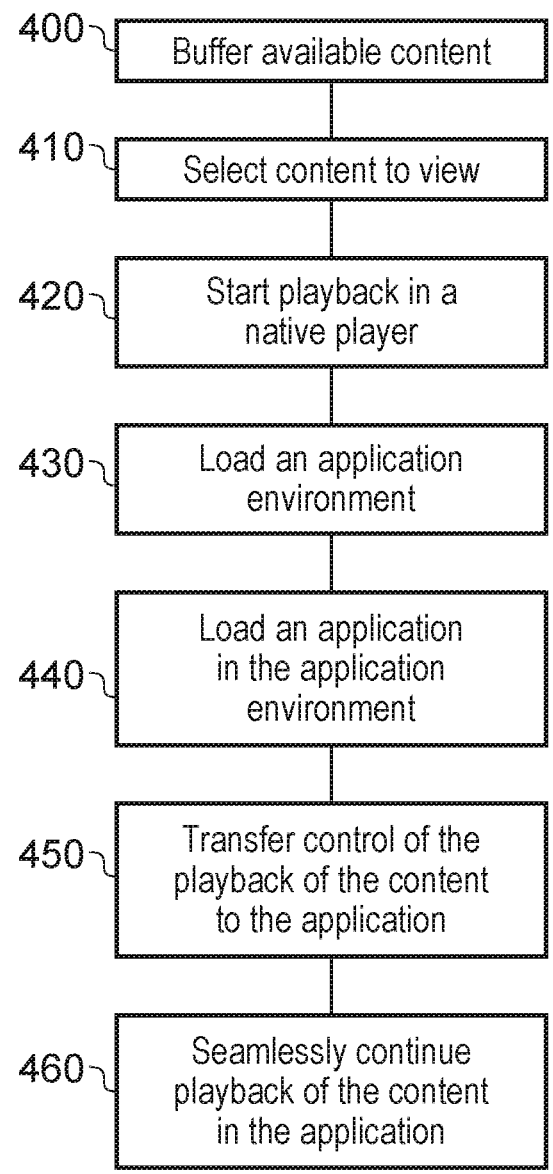
FIG. 3
FIG. 4

VIDEO CONTENT REPLAY

CROSS REFERENCE TO RELATED APPLICATIONS

The present application claims the benefit of the earlier filing date of GB1505326.7 filed in the United Kingdom Intellectual Property Office on 27 Mar. 2015, the entire contents of which application are incorporated herein by reference.

BACKGROUND

Field

This disclosure relates to video content replay.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

It is known for viewers to be able to access video content provided by a third party through a set-top box (STB) or directly through a television for example. Arrangements such as this may be used in the context of a television channel that provides catch-up services for their programmes or an on-demand service for the provision of video content such as movies, for example. These services may be supplied free of charge by the content provider (often with a number of advertisements in order to provide revenue for the content provider), or on a subscription or pay-per-view basis.

The supply of video content in this context may be achieved by launching an application that is associated with the content provider, allowing the viewer to navigate a selection of available programmes or other video content, select a preferred item from the selection and then start playback of the video content. Alternatively, a list of the available content may be supplied to the STB (or other device) and the viewer may be able to make a choice of content using this list in a native application without launching the application first. Once a selection has been made, the appropriate application corresponding to the video content is then launched and playback may begin.

Each of these methods potentially introduces an associated delay to the beginning of the video content replay process which may be undesirable for a viewer. This is usually attributed to the initial loading of the application to view the content or the loading of the application to play the content once a selection has been made. The present disclosure provides an arrangement to reduce this delay.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which:

FIG. 3 schematically illustrates a control transfer process;

FIG. 4 schematically illustrates a control transfer process with a buffering step;

DESCRIPTION OF THE EMBODIMENTS

Figure 1:
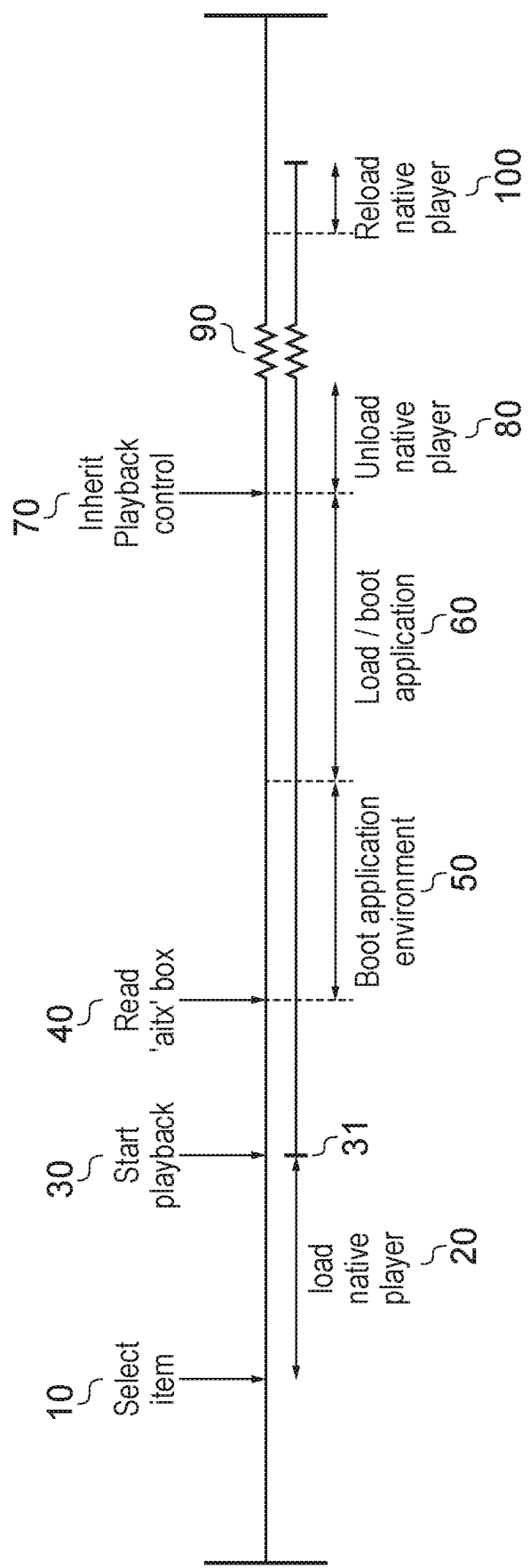
FIG. 1 schematically illustrates a timeline of a video replay method.

FIG. 1 is a schematic illustration that outlines a video replay method according to the present disclosure. It will become apparent in the following description of FIG. 1 that there are many possible variations within this method, and the relative durations of different events as shown are not intended to be to scale, and as such the timeline should not be considered to be limiting. The features discussed with reference to FIG. 1 will be described in greater detail below with reference to further figures.

The method shown on the timeline begins at a stage 10 with a selection of an item for playback. This could be a selection from a number of offered programmes from a source such as a television catch-up service provider or a local storage medium, or may be omitted altogether if the video content is to be started without a selection being made (for example, an auto-played video). In response to the initiation of video content playback, a first or native video player is loaded at the stage 20. This is a video player associated with the host device, rather than with the video content which is to be played.

The players may be embodied in software code and stored or provided by a non-transitory machine-readable medium.

As examples, the video content may be downloadable or streamed content, for example from a server and/or via a network or internet link, or may be content obtained by a peer-to-peer system, or may be locally stored content such as on a removable memory device. The video content may have one or more associated audio tracks or other audio content, and optionally one or more types of selectable subtitles. The video content may comprise a number of video content items rather than being a single piece of content. For example, the video content could comprise a playlist of fragments of short duration videos each located on a server, with each fragment being identified by a universal resource identifier (URI). A first video player may be configured to obtain data for video content in response to the initiation of replay of the video content.

Once the native player is loaded, video content playback is started at a stage 30. The runtime of the video is represented by a line 31, with a break in scale 90 included to show schematically that the video may run for a longer period of time that would be appropriate to show with any sense of scale. It should be appreciated that a buffering period may be employed before beginning playback, and the buffering may be implemented in any of a number of ways, some of which will be discussed below.

At a stage 40 an 'aitx' box, a data structure which corresponds to an Application Information Table, is detected in the associated metadata for the video content. This contains information about an associated video replaying application that is the preferred client for managing the video as determined by the content supplier. Other methods of providing this information could be implemented, such as use of a different box in the header or an identification of the source of the video upon selection. The 'aitx' box will be described in more detail below. The stage 40 provides an example of which a processing unit is configured to detect a data item associated with the video content, the data item identifying the second video content player.

Upon reading of the 'aitx' box at the stage 40, or in other words in response to initiation of replay by the first player, an appropriate application environment is booted 50, for example by a processing unit configured to load a second video content player in response to the initiation of the playback of the video content by the first video content player. This application environment could be in the form of a web browser, for example, and is able to load an application at a stage 60, such as an HTML5 player, which is intended to take control of the playback of the playback and act as a second video content player. (HTML5 stands for HyperText Markup Language version 5, and represents a markup language used for structuring and presenting internet content, for example. This application may have additional functionality relative to the native player, as well as a different user interface (UI) and branding which relates to the video content supplier. Therefore, this provides an example of the second video content player being located in an application environment, a processing unit being configured to launch the application environment in response to detection of the data item associated with the video content.

The application loaded at the stage 60 provides an example of a second video content player.

Control of the video content playback is inherited at a stage 70 by the application loaded at the stage 60, such that the UI (user interface, for example one or more controls having an on-screen representation) associated with this application and any additional features are now accessible by the viewer.

In the context of present disclosure, 'inherited' is intended to mean that control of the video content playback is passed from one player to another. This may be performed in a number of ways, and should not be considered to be limited to a process in which one player passes control to another. This term should also be understood to represent a handover or reassigning of the control, for example. A handover, in this context, could mean that the first and second video content players each have an active role in either giving up control of the video content or receiving the control. A reassigning of the control could, in this context, refer to operations of a third party application which is able to transfer control of the playback from one player to another without either of them necessarily having an active role in the transfer. Alternatively, the video content player that receives control could actively take control of the playback from the other player. Use of the word 'transfer' in any of the described embodiments may be taken to mean any one of these options or any other related process in which control of the playback is transferred from one player to another.

Although shown at the point at which the application finishes loading, the transfer of control may be implemented before the application is fully loaded; for example, the application could be transferred control of the content as soon as sufficient resources to handle playback have been loaded. Once playback control has been transferred at a stage 70, the native player may be unloaded at a stage 80 as it is no longer required for playback. It may however be reloaded at a later time (such as at a stage 100), for example towards the end of the playback of the video content so as to control the transition from the video content to the native UI (for example menus associated with the display device rather than the video content supplier).

A content-control transfer unit (discussed below) can be configured to transfer control of the playback of the video content from the first video content player to a second video content player such that the plurality of images displayed by the second video content player are each displayed at their respective display times as if they had been displayed by the first video content player and the first image of the plurality of images displayed by the second video content player and the last image of the plurality of images displayed by the first video content player are sequential images in the video content.

Figure 2:
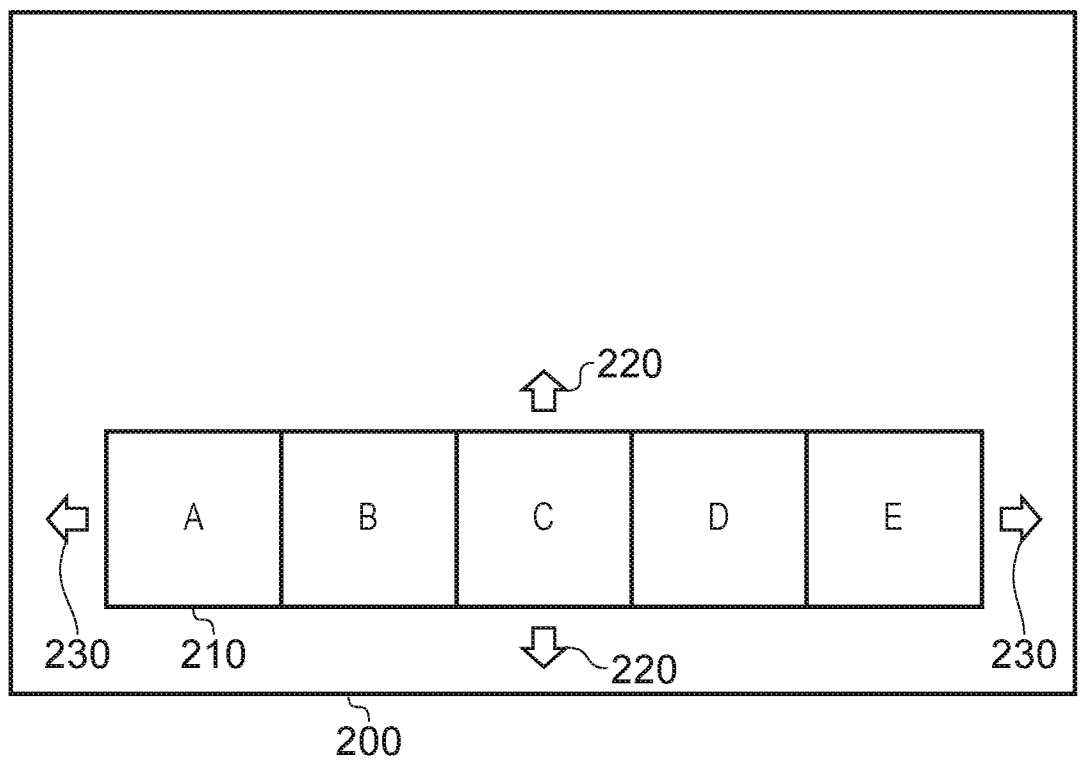
FIG. 2 schematically illustrates an example native user interface for video selection.

FIG. 2 shows a schematic example of a selection screen for video content, as an example of a user interface by which a viewer may select video content for display. The display 200 shows a number of options 210 (with icons representing options A-E currently displayed, and any icons corresponding to further options are hidden) which may all be from the same video content provider or from a variety of providers. The vertical arrows 220 may be provided which typically allow a user to navigate between different providers or content categories (for example), while the horizontal arrows 230 may allow users to navigate icons representing a list of content from the same provider or category. These icons could be displayed in a carousel format, such that a user may continuously cycle through the icons to make a selection using either of the horizontal arrows 230, or could be grouped together so that a user can be presented with an entirely new set of icons by selecting either of the horizontal arrows 230 for example. The use of this interface has been described in the context of using a cursor to navigate the options, but alternatively the icons themselves could be moved and whichever icon is in the central slot (C in the Figure) is the one to be selected if and when the user presses an "enter" key, for example on a remote commander—the central slot could be highlighted in some manner (such as a border) to communicate this to a user. In this embodiment the arrows 220 and 230 are not selectable, but instead indicate to the user that further, currently not displayed options are available to be selected.

Similarly, this type of interface may be used for the playback of content that is stored locally on a hard drive or on removable media—for example, the arrows 220 could correspond to a change of storage medium (such as from an internal hard drive to a USB flash drive) and the arrows 230 could correspond to navigating icons representing respective media files stored on the currently selected medium.

When receiving content is may be desirable to buffer content. This means that a portion of the video content is downloaded and stored locally prior to the beginning of the display of the content. This buffering of video content is performed so that a substantially uninterrupted viewing experience can be provided to viewers, as having data stored for (up to) a set period or (up to) a set amount of data in advance of reproduction and replay of video content represented by that data means that varying network conditions may be less impactful on the playback of the video content.

Buffering of videos may be initiated whilst the viewer navigates this screen in order to reduce the delay in displaying content once selected. This buffering is performed as a predictive feature, and as such could take the form of buffering the content corresponding to the icon C in FIG. 2 (as the central icon) in preparation for a selection. It is also possible that more than one video is buffered, for example the content corresponding to the central icon C and the content represented by options either side of this (B and D, so that 3 videos are being buffered at any given time) or all of the options that are currently available on screen for selection. In other implementations the content corresponding to a predetermined number of icons that have most recently occupied the central slot. The latter options provide a more robust buffering implementation than the first option, as they allow for a user to move between options without necessarily discarding the already-buffered content for an earlier option should they then choose to go on to select it. Alternatively, buffering could be performed for content that is determined in other ways such as a prediction based on a viewer's previous viewing statistics. A least-recently written file may be flushed or cleared from the buffer in response to another icon being currently selected.

This arrangement therefore provides an example of the use of a video buffer associated with the first video content player, and in which video content is pre-buffered by the video buffer before a playback operation is requested, and an example of an arrangement in which a second video content player is configured to use a buffer associated with the first video content player to continue playback of the video content.

Once the buffering has been completed and the selection of the content made, the native player associated with the system is launched 20 and begins to play 30 the video.

FIG. 3 schematically illustrates the process described in FIG. 1 as a series of steps rather than as a timeline. Content for viewing is selected 300 in the first step, and playback is started 310 in the native player. An application environment is then loaded 320 (in accordance with the information contained in the AIT) and an application is loaded 330 within this environment. Control of the playback is then transferred 340 from the native player to the loaded application and playback continues 350 in a seamless manner. Optionally, the native player 360 is reloaded at a later time during the playback.

'Seamless', in the context of the transfer of control of the playback, means that there is no break in the display of frames. Frames that are to be presented to the viewer on the display at a given time (a respective display time for each frame) are still presented at that respective time despite the transfer of control of the playback, so that the viewer is left unaware of the transition except for any UI changes and the like. An example method for implementation is the use of an invisible, full-screen window that is displayed as the application environment is launched. The invisible window allows the viewer to see the content being displayed by the native player, but when the application is fully loaded the invisible window is instead used to display the content. As the window is already loaded and present on the screen, the disruption caused by the transition between video content players is reduced.

FIG. 4 schematically illustrates a similar method in which there is a buffering step 400 for the content. In the Figure the buffering 400 takes place (or at least is started) in the first step prior to the selection of the content to be viewed (as discussed earlier with reference to FIG. 2), although it should be understood that this step could take place after the selection 410 of the content to be viewed. After the content to be viewed is selected 410, playback is started 420 in the native player. An application environment is then loaded 430 (in accordance with the information contained in the AIT) and an application is loaded 440 within this environment. Control of the playback is then transferred 450 from the native player to the loaded application and playback continues 460 in a seamless manner.

Figure 5:
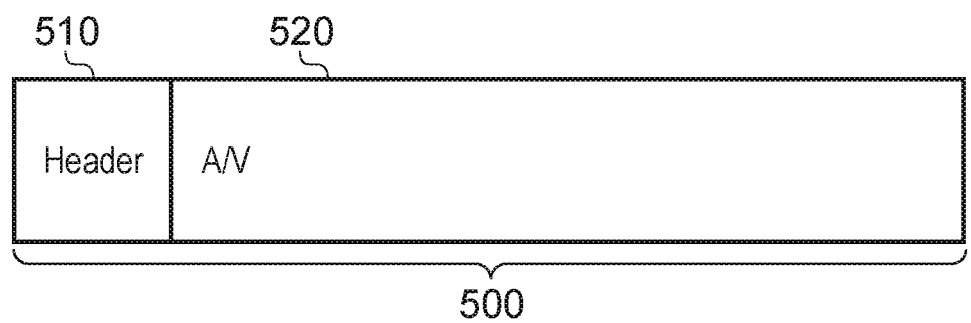
FIG. 5 schematically illustrates an exemplary data structure.

FIG. 5 shows an exemplary data structure 500 used for video content comprising a header 510 and audio and video (A/V) information 520. In the present arrangement information is added to or otherwise included in the header 510 to indicate the details of an application that should be launched to control the video content playback. In one embodiment, this is in the form of an Application Information Table (AIT) which may be represented by an 'aitx' or 'aitb' (XML or binary XML expression) box depending on the desired format. A box is an object defined in the MP4/ISOBMFF (ISO (International Organisation for Standardization) Base Media File Format) standards, and boxes are used as containers to carry all of the data in such a file. Boxes are specified by a four-character code identifier (for example, 'ftyp') to ensure that the correct box is read to locate the desired data. The 'aitx'/'aitb' box will now be discussed in the context of an MP4/ISOBMFF file as an example of an implementation method, and provides an example of a data structure inserted into video content that is read during playback of the video content by a first video content player to indicate that a second video content player should be launched to take control of the video content playback.

The 'aitx' box could be provided as part of a movie atom (moov) or could be fragmented and distributed as accompanying metadata. Further instances of 'aitx' boxes could be provided at different points in the video content.

The AIT is specified by ETSI TS 102 809 v1.1.1, the contents of which are hereby incorporated by reference. A schematic example of an 'aitx' box (in this example, contained in a container "meta" rather than "moov") is as follows:

```
Box Type: 'aitx'
Container: Meta box ('meta')
Mandatory: No
Quantity: Zero or one (Note: More than one, there should be a
bigger XMLAIT with more XML in it....).
    aligned(8) class XMLAITBox
        extends FullBox('aitx', version = 0, 0) {
    string xml;
}
```

An ISOBMFF file consists of a number of boxes which act as containers to contain data such as video content and metadata. Each of these boxes is identified with a four character code, and may contain further boxes. For example, the first box in the file is the 'ftyp', which defines the file type and compatibility information and has no boxes included in it. There are several locations in the file in which a box can be used that do not have a specified function already. In one embodiment, the 'meta' box is selected and a box is created within this top-level box that is named 'aitx' or 'aitb' depending on whether it is in XML or binary XML format. This box contains information about the application that should be launched to take control of the video playback, such as in the form of an application information table. It should be appreciated that this method could be applied to a number of different file types that contain support for new data to be inserted into the header.

HbbTV (Hybrid Broadcast Television) has a concept of b-i and b-r application launches, where b-r signifies broadcast-related and b-i signifies broadcast-independent. these indicate a respective mode that an HbbTV application can launch into. If launched form broadcast, the application is launched in b-r mode (and broadcast AV can be controlled). If the launch is from a portal or an application then it is launched in b-i mode (no access to broadcast AV unless certain other actions are taken). Further the native application interface may indicate/override what kind of launch occurs. The native app would also decide if it is parsing and interpreting and auctioning signalling data in the stream.

For a b-i launch

A technique for making this transition seamless is as follows:

the video object must be in the Document Object Model (DOM) Javascript tree at pageload time; which is to say, a video object is created and correctly configured with the correct @src when either one or more of the following:

body.onload( ) has completed; or a script triggered by "@run-at document-start" has executed.

the @src="rec://current-media-player" (a command which sets the source of video to be replayed as the current media player of the television receiver). Alternatively a child <source/> element could also be used in place of the @src attribute.

For a b-r launch, the media playout would continue to run while the application boots and loads. The application is not visible until application.show( ) is called, where application is an instance of an "application" object as defined in HbbTV. The inheritance or transfer therefore occurs before show( ) is called. There is no video/broadcast object while this loads—even if there was it would not show anything after application.show( ) since no broadcast is ongoing.

The <video/> has a src attribute (or child <source/> element) written that is e.g. rec://current-media-player. The currentSrc when read is the media URL that was of the media asset that the native application was using.

Once inherited, all the other video attributes and state variables are set to what they otherwise would be if the video playback had got to the state that it is currently under if it were initially loaded from an HTML environment. Events from 4.7.10.16 of [HMTL5] would fire, but perhaps directly and bypassing some of the state machines states to get to the actual state it is in.

Once the application environment and application have been loaded, playback control is transferred to the new application from the native application. This can be handled in any of a number of ways, as will now be described with reference to FIGS. 6-12.

Figure 6:
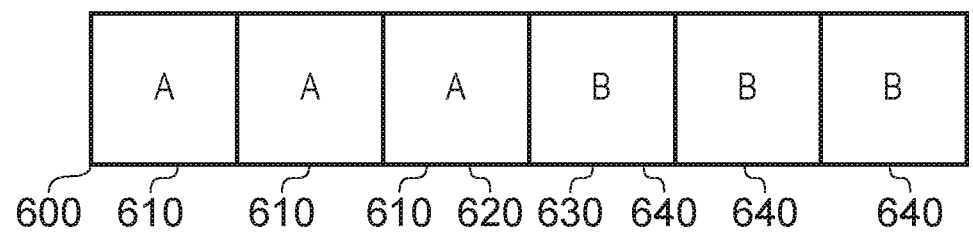
FIG. 6 schematically illustrates a series of pictures at a GOP boundary.

FIG. 6 shows a set of frames 600 that form a portion of the video content. Frames 610 belong to a first group and frames 640 belong to a second, where each group of frames may correspond to a portion of a group of pictures (GOP) as may be used in video coding methods. It may be desirable to perform the transfer of playback control at a boundary between two GOPs, as this is a natural breakpoint in the playback. Performing the transfer at a time other than at a GOP boundary would require both content players to process the same GOP due to the interdependencies of the pictures contained in the GOP, which may be undesirable due to extra processing required to prepare the same set of pictures for display twice.

In the context of FIG. 6, for a transfer of control at the boundary between frames 620 and 630, control may be transferred to the loaded application during the display of frame 620 or at any time before this with appropriate timing information (for example, transfer playback control at the next GOP boundary). This transfer would not necessarily have to take place during the display of the GOP denoted by A's, it could equally be implemented in any GOP before this with the transfer of playback control delayed until the boundary between frames 620 and 630. It should also be noted that frames 620 and 630 need not necessarily be different in terms of their aesthetic content, for example during looped content or in the event that the same frame is continuously output during a pause operation control could still be transferred.

Accordingly, in examples, the content-control transfer unit is configured to transfer control of the video content at a GOP boundary in the video content.

Figure 7:
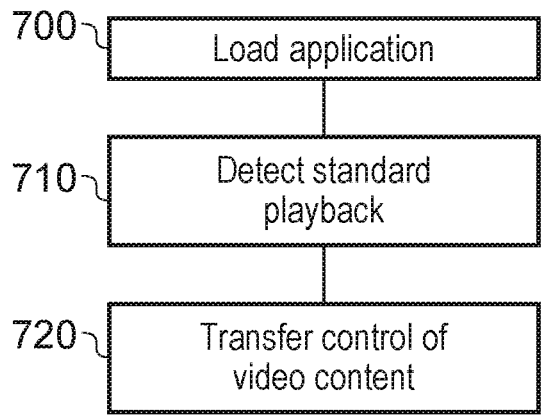
FIG. 7 schematically illustrates a control transfer process.
Figure 8:
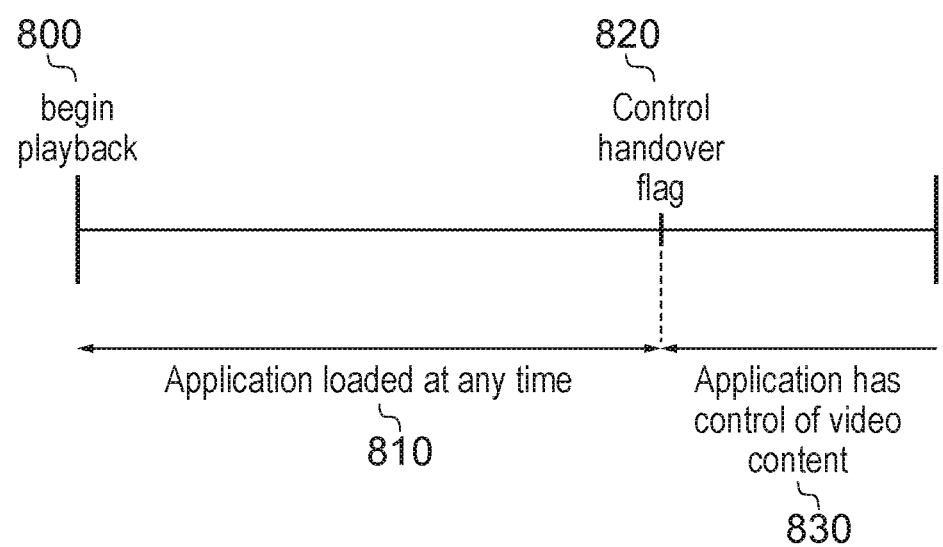
FIG. 8 schematically illustrates a timeline of a control transfer process.

FIG. 7 schematically illustrates a playback control transfer process according to present embodiments. In this process the application is loaded at 700 and then at 710 a determination is made that the content is being displayed in a standard playback mode, which is to say, no operations affecting playback are being performed such as a pause or a seek. The control is then transferred 720 to the application. FIG. 8 schematically illustrates a timeline of a transfer according to this process.

FIG. 8 shows the beginning of playback at 800, with the time 810 corresponding to the loading of the application environment and application. The time 810 need not correspond exactly to the time taken to load the application, if the application is loaded before the end of the time 810 then the application can wait for a signal to take control of the content playback at a later time or initiate the transfer process at an earlier time. In this Figure the transfer is signalled by a flag at a time 820, but it could also be handled by performing the transfer at a predetermined elapsed time of the video content (so as to provide enough time for the application to be loaded and ready) or a set period during or after the loading of the application for example. After this, in the period 830, the application has control of the content playback.

Figure 9:
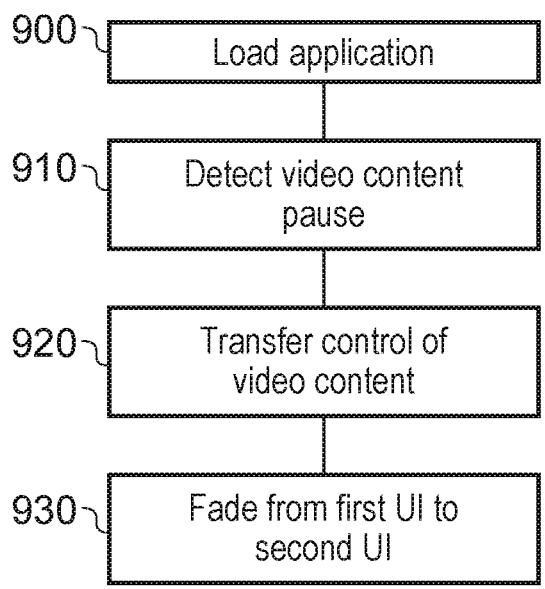
FIG. 9 schematically illustrates a control transfer process in which the content is paused.

FIG. 9 schematically illustrates a corresponding process when the content is paused during the period in which the control transfer is performed. The application is loaded 900 and a pause of the video content is detected 910. Transfer 920 of the video content is still performed in this embodiment, and the first UI is switched to the second in a fade operation 930. It should be appreciated that these steps may be performed in any order or substantially simultaneously—for example the UI could be switched before the application is fully loaded, with any unloaded functionality temporarily disabled, whether a pause is detected or not. In these examples, the content-control transfer unit is configured to transfer playback state information (such as a pause status) of the video content to the second video content player; and the second video content player is configured to commence replay of the video content according to the transferred playback state information.

Figure 10:
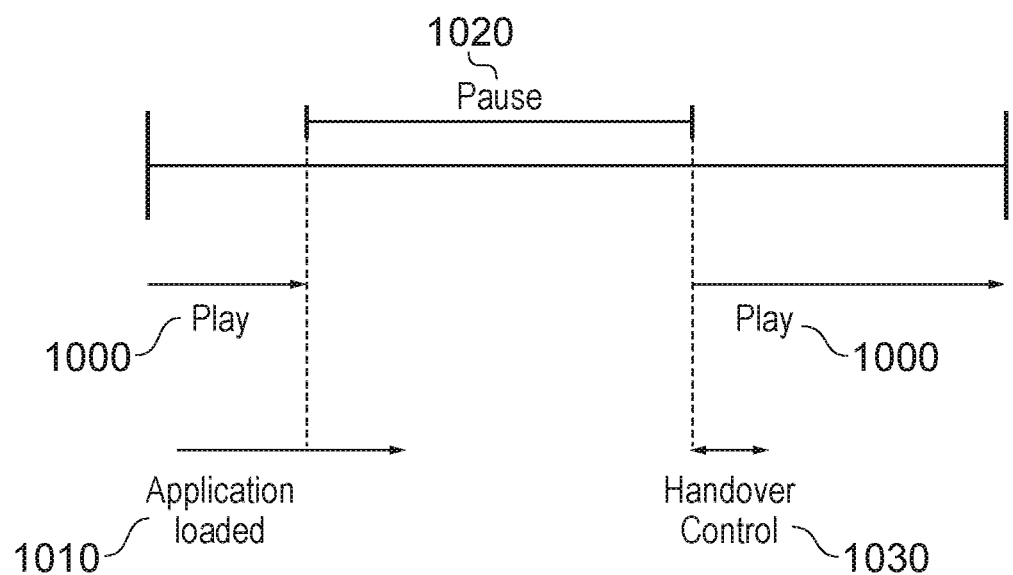
FIG. 10 schematically illustrates a timeline of a control transfer process in which the content is paused.

FIG. 10 is a timeline that schematically illustrates an alternative embodiment in which a control transfer is performed during a pause, although it could equally be applied to other operations such as a seek as described with reference to FIG. 11. Playback continues 1000 until the pause 1020, during which the application is loaded in the period 1010 and ready for control to be transferred during the pause 1020. However the transfer is delayed until the period 1030, after the pause 1020 has ended. The transfer is performed when play 1000 is continued, and is implemented in a standard manner corresponding to straightforward playing of the content.

More generally, with FIG. 10 being an example, the content-control transfer unit can be configured to delay transfer of control of the video content during one or more of:

(i) playback-modifying operations performed on the video content (such as pause, shuttle, skip and the like); or (ii) use of a user interface associated with the first video content player.

Figure 11:
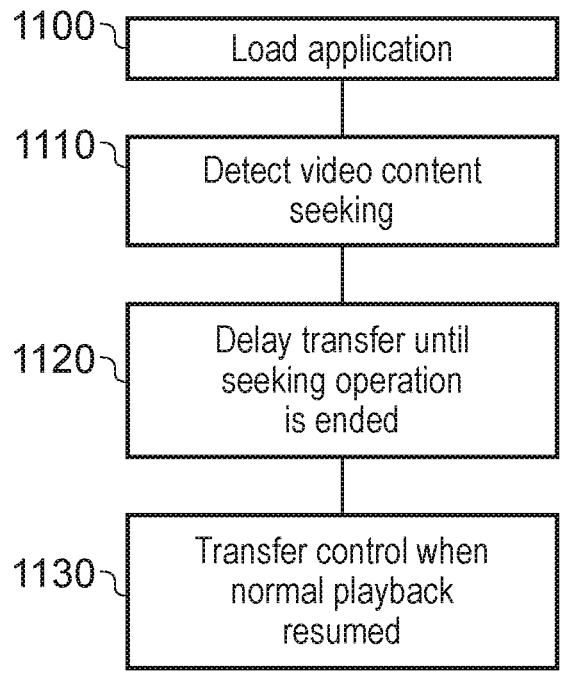
FIG. 11 schematically illustrates a control transfer process in which the a seek operation is being performed.

FIG. 11 schematically illustrates a corresponding process to FIG. 10 with reference to a seek operation. The application is loaded at 1100 and a detection is made 1110 that there is a seek operation being performed. The control transfer is then delayed 1120 until the seek operation is ended and normal playback is resumed, at which point the transfer is performed 1130. A delay in the transfer may be implemented in a number of ways, for example the loading of the application could be paused in response to an operation being performed with respect to the video content playback. Alternatively, the loading of the application could be cancelled during the operation, with the loading of the application restarting upon the resumption of normal playback. In both of FIGS. 10 and 11 the transfer may be further delayed once the pause/seek operation has been concluded, it is not necessarily performed immediately.

Figure 12:
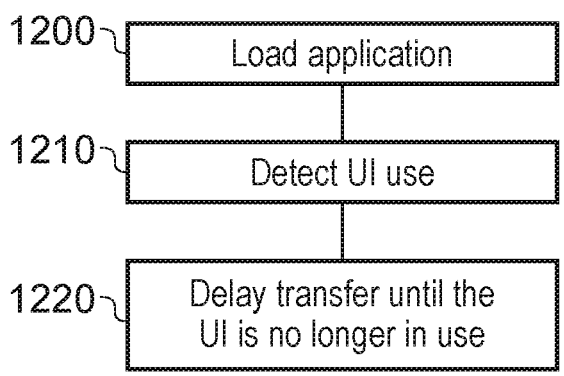
FIG. 12 schematically illustrates a control transfer process in which a UI is in use.

FIG. 12 schematically illustrates a process in which the transfer of control is delayed when the UI is in use. An application is loaded 1200, and a detection 1210 of the UI being either in use or simply displayed to a viewer is made. Handing over control of the playback during the use of the UI could be inconvenient to the user if it were to cause the UI to switch from the native player to the loaded application as the user would be caused to exit the native UI. Therefore it may be desirable to delay 1220 the transfer until the UI is no longer in use or displayed, switching at a time after normal playback has resumed in a similar manner to that of FIGS. 10 and 11. Alternatively, transfer of control could be performed such that the loaded application controls the playback and only the UI is not used from the new player until such a time as the native UI is no longer in use or displayed.

Although many of the above embodiments have been described with reference to a transfer process at the beginning of the viewing of content they may equally be applied to other times. For example, a transfer could be performed towards the end of the content such that the native player has control of the playback throughout the majority of the content viewing. This could be used to provide the viewer with further content options to select (for example, a 'related programmes' type message) that are associated with the provider of the loaded application. Another alternative is that control can be switched for the purposes of displaying advertising during the content playback, in which one of the native player or a loaded application (either the one associated with the viewing content or another application that could be launched specifically to provide advertisements) handles most of the content playback and the other is used to provide the viewer with advertisements. In this embodiment, the control transfer can be handled in the same manner as that described above but with a greater frequency and signalling of when the advertisements should be displayed; for example the native player can interrupt the display by the loaded application or either of these could be provided with timing information signalling times at which the transfer should be initiated.

Figure 13:
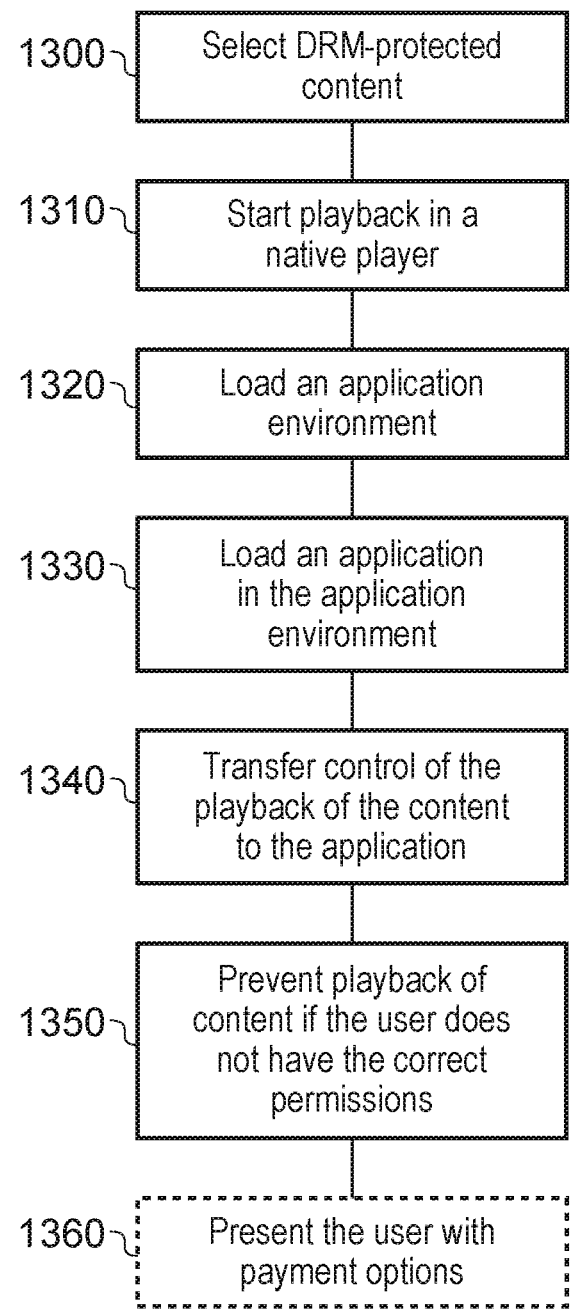
FIG. 13 schematically illustrates a control transfer process in which the content is DRM-protected.

FIG. 13 schematically illustrates another application of the transfer method as described above. In this embodiment, the content that is selected 1300 for viewing is protected by DRM (Digital Rights Management). This content could be obtained from a number of sources, such as those discussed previously, as long as the content can be identified as being protected by the associated application intended to be used for playback. This could be through the reading of associated metadata or watermark recognition, for example. Playback is started 1310 in a native player, and an application environment is loaded 1320 in response to the AIT. An application is then loaded 1330 and control of the playback is transferred 1340. Once the transfer 1340 is complete, the application is able to read metadata associated with the content and determine that it is protected with DRM. At this point the viewer is prevented 1350 from viewing more of the content and optionally presented 1360 with options for payment for access to the content.

In some embodiments, the viewer is instead provided with a warning, but allowed to continue watching the content for a predetermined amount of time; for example the viewer may be allowed to watch the first 10 minutes of a programme or movie as a sample to gain their interest, increasing the chances of the viewer proceeding to purchase access to the content.

Control can be transferred back to the first video content player, either at the end of playback of the video content or during the video content (for example, to provide each commercial break). In examples, the content-control transfer unit is configured to transfer control of the video content back to the first video content player at the end of the video content playback or in response to detection of a further data item associated with the video content, the further data item indicating a transfer of control back to the first video content player.

Figure 14:
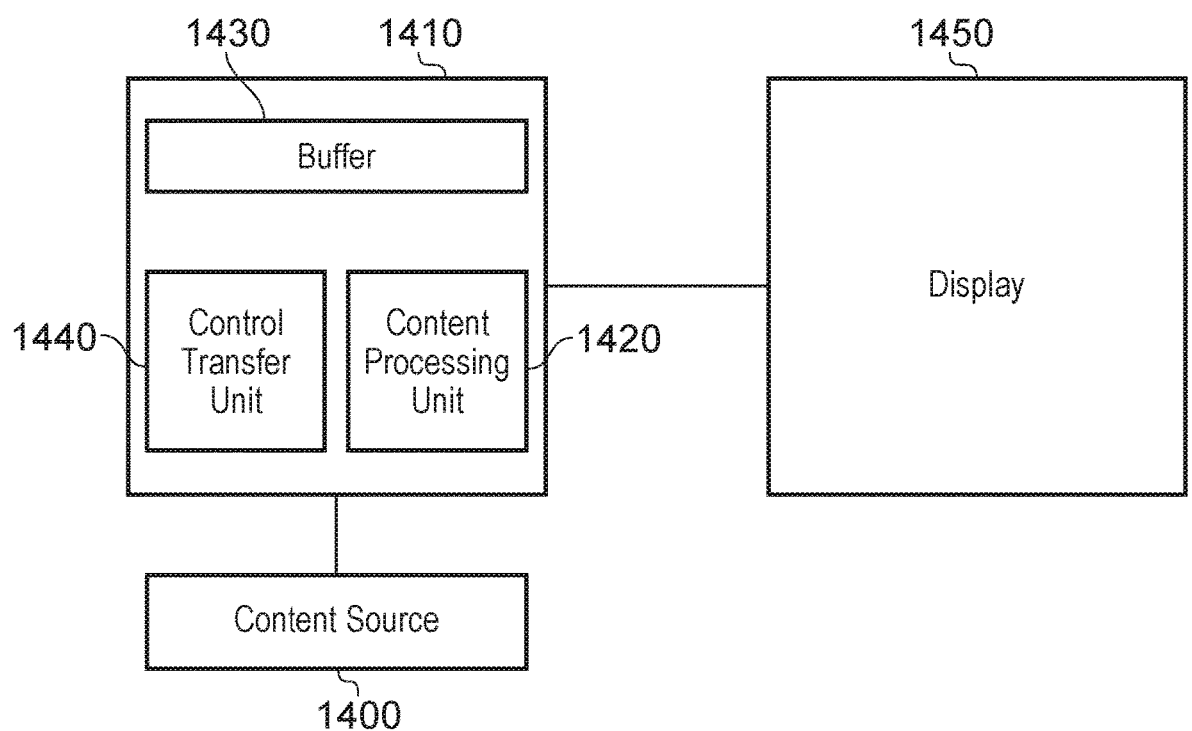
FIG. 14 schematically illustrates a hardware arrangement configured to implement a control transfer process.

FIG. 14 schematically illustrates a hardware arrangement used to implement a method as described above. A content source 1400 is provided, which may be in the form of a set-top box, internet connection, optical media or USB flash drive for example. The content is provided to a processing unit or circuitry 1410 which comprises a content processing unit or circuitry 1420, a buffer or buffer circuitry 1430 and a control transfer unit or circuitry 1440. Output video content is provided to the display 1450 for display.

The content processing unit 1420 receives content from the content source 1400 and performs any necessary decoding operations to prepare the content for display. The content processing unit 1420 therefore provides an example of a first video content player operable to begin playback of video content comprising a plurality of images to be displayed at respective display times. Information about the transfer process (such as the AIT) is passed to the control transfer unit 1440, while A/V content is prepared for display and stored in a buffer 1430 ready to be provided to the display 1450. Alternatively, the buffer 1430 can store undecoded content data.

The control transfer unit 1440 receives information about the transfer, such as which application is to be launched, when to perform the transfer and any other information such as that indicating any DRM-protection of the content. The control transfer unit 1440 is then operable to launch the appropriate application environment and application and implement the transfer of playback control in a method corresponding to any of the previously-described embodiments. In examples, the video content is protected by digital rights management; and the second video content player is configured to give a viewer an option to purchase access to the video content in response to a transfer of control to the second video content player.

The content transfer unit therefore provides an example of a processing unit configured to load a second video content player (for example, as an application to be executed by the content processing unit, separate to an application providing the first video content player) in response to the initiation of the playback of the video content by the first video content player; and a content-control transfer unit configured to transfer control of the playback of the video content from the first video content player to a second video content player such that the plurality of images displayed by the second video content player are each displayed at their respective display times as if they had been displayed by the first video content player and the first image of the plurality of images displayed by the second video content player and the last image of the plurality of images displayed by the first video content player are sequential images in the video content.

The buffer 1430 stores data for a plurality of images to be displayed at the display 1450. The buffer 1430 is operable to be used by both the native player and the loaded application as the transfer is performed, rather than each application necessarily having its own corresponding buffer.

Figure 15:
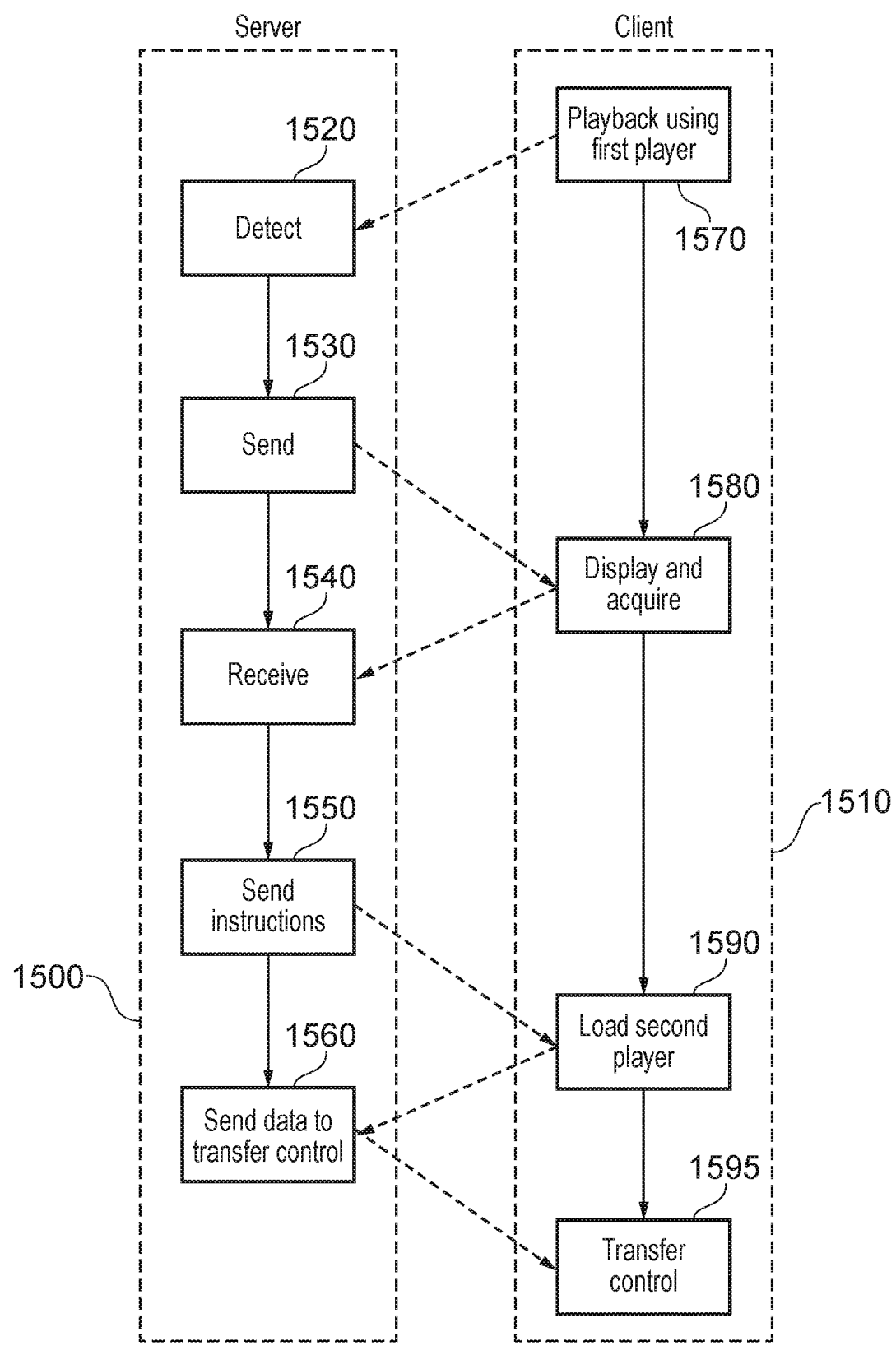
FIG. 15 is a schematic flowchart illustrating a succession of processing steps carried out by a server and a succession of processing steps carried out by a client.
Figure 16:
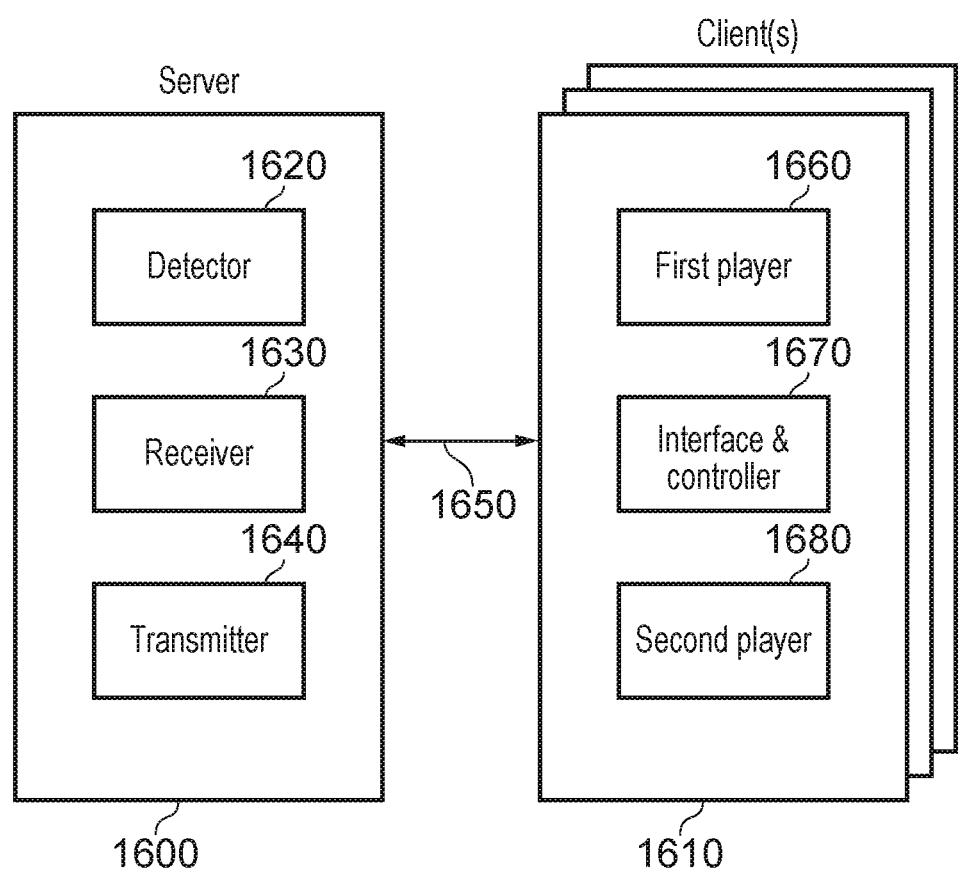
FIG. 16 schematically illustrates a server and a client.

FIGS. 15 and 16 relate to the techniques discussed above, carried out in an example server-client context.

FIG. 15 is a schematic flowchart illustrating a succession of processing steps carried out by a server (a set of steps bounded by a broken line box 1500) and a succession of processing steps carried out by a client associated with (for example, having a data connection with) the server (a set of steps bounded by a broken line box 1510). As far as the server is concerned, it carries out the steps shown within the box 1500, and as far as the client is concerned, it carries out the steps within the box 1510. Therefore, the steps within the box 1500 can be considered as a method relating to a server, and the steps within the box 1510 can be considered separately as a method relating to a client. Having said this, broken line linkages are provided between the two in order to indicate how the two methods relate to one another.

The terms "client" and "server" relate to the relationship between the two systems, in that the "server" carries out some functionality discussed below. No other limitations are implied by the terms "client" and "server".

The method relating to the server comprises:
detecting (at a step 1520) playback using a first video content player of video content comprising a plurality of images to be displayed at respective display times;
sending (at a step 1530), via an interface (which may include an interface 1650, see below), payment option data in respect of the video content;
receiving (at a step 1540) an indication of purchase data;
in response to the indication of purchase data, sending (at a step 1550) instructions which when executed from electronic memory load a second video content player in response to initiation of the playback of the video content by the first video content player; and
sending (at a step 1560) data allowing the transfer of control of the playback of the video content from the first video content player to a second video content player such that the plurality of images instructed to be displayed by the second video content player are each displayed at their respective display times as if they had been displayed by the first video content player and the first image of the plurality of images instructed to be displayed by the second video content player and the last image of the plurality of images displayed by the first video content player are sequential images in the video content.

The method relating to the client comprises:
carrying out playback using a first player at a step 1570;
displaying received payment option data and acquiring a user response to the payment option data; transmitting data indicative of the user response to the server (at a step 1580);
loading a second player (at a step 1590); and
transferring control to the second player (at a step 1595).

In an example system, the flow of control between these two methods may proceed as follows:
the step 1520 is responsive to the step 1570;
the step 1580 is responsive to the step 1530;
the step 1540 is responsive to the step 1580;
the step 1590 is responsive to the step 1550;
(optionally) the step 1560 is responsive to the step 1590 (or in other examples, the server can simply impose a suitable delay between the steps 1550 and 1560 to allow the step 1590 to be performed); and
the step 1595 is responsive to the step 1560.

FIG. 16 schematically illustrates a server 1600 and a client 1610 (which may be one of multiple clients associated with the server 1600).

The server comprises:
a detector 1620 configured to detect playback using a first video content player of video content comprising a plurality of images to be displayed at respective display times;
a receiver 1630 configured to receive an indication of purchase data; and
a transmitter 1640 configured to send via an interface, payment option data in respect of the video content, and in response to the indication of purchase data, to send instructions which when executed from electronic memory load a second video content player in response to initiation of the playback of the video content by the first video content player, and to send data allowing the transfer of control of the playback of the video content from the first video content player to a second video content player such that the plurality of images instructed to be displayed by the second video content player are each displayed at their respective display times as if they had been displayed by the first video content player and the first image of the plurality of images instructed to be displayed by the second video content player and the last image of the plurality of images displayed by the first video content player are sequential images in the video content.

The client 1610, connected to the server by a data connection 1650, comprises a first player 1660, an interface and controller 1670 (to receive information from the server, to send information to the server, and to control the operation of and transfer of control between the first player and the second player), and a second player 1680.

In summary, embodiments of the present disclosure relate to playing a video stream in a native application/interface. This video stream contains application signalling that can be used to boot a non-native application/interface. This application would then boot, and would seamlessly inherit at assume control of the playing video. Three features are (a) signalling the non-native application/interface; (b) rules for seamless inheritance; and (c) initial constraints for the first few 'milliseconds' of time when the non-native application/interface assumes control of the video.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

It will be apparent that numerous modifications and variations of the present disclosure are possible in light of the above teachings. It is therefore to be understood that within the scope of the appended claims, the technology may be practiced otherwise than as specifically described herein.

Respective embodiments are defined by the following numbered clauses:

1. A video content replay apparatus comprising:
   a first video content player operable to begin playback of video content comprising a plurality of images to be displayed at respective display times;
   a processing unit configured to load a second video content player in response to the initiation of the playback of the video content by the first video content player; and
   a content-control transfer unit configured to transfer control of the playback of the video content from the first video content player to a second video content player such that the plurality of images displayed by the second video content player are each displayed at their respective display times as if they had been displayed by the first video content player and the first image of the plurality of images displayed by the second video content player and the last image of the plurality of images displayed by the first video content player are sequential images in the video content.

2. The apparatus of clause 1, in which the processing unit is configured to detect a data item associated with the video content, the data item identifying the second video content player.

3. The apparatus of clause 2, in which the second video content player is located in an application environment, the processing unit being configured to launch the application environment in response to detection of the data item associated with the video content.

4. The apparatus of any one of the preceding clauses, in which the first video player is configured to obtain data for video content in response to the initiation of replay of the video content.

5. The apparatus of clause 4, comprising a user interface by which a viewer may select video content for display.

6. The apparatus of any one of the preceding clauses, in which the content-control transfer unit is configured to transfer control of the video content at a GOP boundary in the video content.

7. The apparatus of any one of the preceding clauses, in which:
   the content-control transfer unit is configured to transfer playback state information of the video content to the second video content player; and
   the second video content player is configured to commence replay of the video content according to the transferred playback state information.

8. The apparatus of any one of the preceding clauses, in which the content-control transfer unit is configured to delay transfer of control of the video content during one or more of:
   (i) playback-modifying operations performed on the video content; or
   (ii) use of a user interface associated with the first video content player.

9. The apparatus of any one of the preceding clauses, in which the content-control transfer unit is configured to transfer control of the video content back to the first video content player at the end of the video content playback or in response to detection of a further data item associated with the video content, the further data item indicating a transfer of control back to the first video content player.

10. The apparatus of any one of the preceding clauses, in which: the video content is protected by digital rights management; and the second video content player is configured to give a viewer an option to purchase access to the video content in response to a transfer of control to the second video content player.

11. The apparatus of any one of the preceding clauses, comprising a video buffer associated with the first video content player, and in which video content is pre-buffered by the video buffer before a playback operation is requested.

12. The apparatus of clause 11, in which the second video content player is configured to use a buffer associated with the first video content player to continue playback of the video content.

13. A method for replaying video content, the method comprising:
   beginning playback using a first video content player of video content comprising a plurality of images to be displayed at respective display times;

loading a second video content player in response to initiation of the playback of the video content by the first video content player; and transferring control of the playback of the video content from the first video content player to a second video content player such that the plurality of images displayed by the second video content player are each displayed at their respective display times as if they had been displayed by the first video content player and the first image of the plurality of images displayed by the second video content player and the last image of the plurality of images displayed by the first video content player are sequential images in the video content.

14. Computer software which, when executed by a computer, causes the computer to carry out the method of clause 13.

15. A non-transitory machine-readable storage medium which stores computer software according to clause 14.

16. A data structure inserted into video content that is read during playback of the video content by a first video content player to indicate that a second video content player should be launched to take control of the video content playback.

17. A method comprising:
detecting at a server playback using a first video content player of video content comprising a plurality of images to be displayed at respective display times;
sending, via an interface, payment option data in respect of the video content;
receiving an indication of purchase data;
in response to the indication of purchase data, sending instructions which when executed from electronic memory load a second video content player in response to initiation of the playback of the video content by the first video content player; and
sending data allowing the transfer of control of the playback of the video content from the first video content player to a second video content player such that the plurality of images instructed to be displayed by the second video content player are each displayed at their respective display times as if they had been displayed by the first video content player and the first image of the plurality of images instructed to be displayed by the second video content player and the last image of the plurality of images displayed by the first video content player are sequential images in the video content.

18. A server comprising:
a detector configured to detect playback using a first video content player of video content comprising a plurality of images to be displayed at respective display times;
a receiver configured to receive an indication of purchase data;
a transmitter configured to send via an interface, payment option data in respect of the video content, and in response to the indication of purchase data, to send instructions which when executed from electronic memory load a second video content player in response to initiation of the playback of the video content by the first video content player, and to send data allowing the transfer of control of the playback of the video content from the first video content player to a second video content player such that the plurality of images instructed to be displayed by the second video content player are each displayed at their respective display times as if they had been displayed by the first video content player and the first image of the plurality of images instructed to be displayed by the second video content player and the last image of the plurality of images displayed by the first video content player are sequential images in the video content.

19. A non-transitory computer readable medium including computer program instructions, which when executed by a computer causes the computer to perform the method of clause 17.

The invention claimed is:

1. A video content replay apparatus, comprising:
a video buffer associated with a first video content player, video content being pre-buffered by the video buffer based on an icon corresponding to the video content; and
circuitry configured to
control the first video content player to begin playback of the video content including a first plurality of images to be displayed at respective display times;
after the beginning of the playback of the video content in the first video content player,
detect metadata of the video content, the metadata identifying an internet-delivered video replaying application environment;
launch the identified internet-delivered video replaying application environment in response to the detection of the metadata;
load a second video content player provided in the identified internet-delivered video replaying application environment; and
transfer control of the playback of the video content from the first video content player to the second video content player such that a second plurality of images displayed by the second video content player are displayed at respective display times and a first image of the second plurality of images displayed by the second video content player and a last image of the first plurality of images displayed by the first video content player are sequential images in the video content, wherein
the second video content player is configured to use the video buffer associated with the first video content player to continue playback of the video content.

2. The apparatus of claim 1, wherein the second video content player is stored in a non-transitory storage medium.

3. The apparatus of claim 1, wherein the circuitry is further configured to control the first video player to obtain data for the video content in response to the beginning of the playback of the video content.

4. The apparatus of claim 1, wherein the circuitry is configured to transfer the control of the playback of the video content at a Group of Pictures (GOP) boundary in the video content.

5. The apparatus of claim 1, wherein
the circuitry is further configured to transfer playback state information of the video content to the second video content player; and
the circuitry is further configured to control the second video content player to commence replay of the video content according to the transferred playback state information.

6. The apparatus of claim 1, wherein the circuitry is further configured to delay transfer of the control of the video content when
(i) a playback-modifying operation is performed on the video content, or
(ii) a user interface associated with the first video content player is used.

7. The apparatus of claim 1, wherein the circuitry is further configured to transfer the control of the playback of the video content back to the first video content player at an end of the video content playback or in response to detection of a data item associated with the video content, the data item indicating a transfer of the control of the playback of the video content back to the first video content player.

8. The apparatus of claim 1, wherein the video content is protected by digital rights management, and the circuitry is further configured to control the second video content player to give a viewer an option to purchase access to the video content in response to the transfer of the control to the second video content player.

9. The apparatus of claim 1, wherein the video content is pre-buffered by the video buffer before the icon is selected or indicated by a user input device, the icon being centrally located among a plurality of icons on a display.

10. The apparatus of claim 9, wherein at least another icon of the plurality of icons next to the icon is also pre-buffered by the video buffer before the video content corresponding to the icon is selected or indicated by the user input device.

11. A method for replaying video content, the method comprising:
pre-buffering video content by a video buffer associated with a first video content player based on an icon corresponding to the video content;
beginning playback using the first video content player of video content including a first plurality of images to be displayed at respective display times;
after the beginning of the playback of the video content in the first video content player,
detecting metadata of the video content, the metadata identifying an internet-delivered video replaying application environment;
launching the identified internet-delivered video replaying application environment in response to the detection of the metadata;
loading, by circuitry, a second video content player provided in the identified internet-delivered video replaying application environment; and
transferring control of the playback of the video content from the first video content player to the second video content player such that a second plurality of images displayed by the second video content player are displayed at respective display times and a first image of the second plurality of images displayed by the second video content player and a last image of the first plurality of images displayed by the first video content player are sequential images in the video content, wherein
the second video content player is configured to use the video buffer associated with the first video content player to continue playback of the video content.

12. A non-transitory computer-readable storage medium including computer program instructions, which when executed by a computer cause the computer to perform the method according to claim 11.

13. A method, comprising:
detecting, by a server, pre-buffering of video content by a video buffer associated with a first video content player based on an icon corresponding to the video content;
detecting, by the server, playback using the first video content player of the video content including a first plurality of images to be displayed at respective display times;
sending, via an interface, payment option data corresponding to the video content;
receiving an indication of purchase data;
in response to the indication of purchase data, sending instructions, which when executed from electronic memory,
after the beginning of the playback of the video content in the first video content player,
detect metadata of the video content, the metadata identifying an internet-delivered video replaying application environment,
launch the identified internet-delivered video replaying application environment in response to the detection of the metadata, and
load a second video content player provided in the identified internet-delivered video replaying application environment; and
sending data allowing the transfer of control of the playback of the video content from the first video content player to the second video content player such that a second plurality of images instructed to be displayed by the second video content player are displayed at respective display times and a first image of the second plurality of images instructed to be displayed by the second video content player and a last image of the first plurality of images displayed by the first video content player are sequential images in the video content, wherein
the second video content player is configured to use the video buffer associated with the first video content player to continue playback of the video content.

14. A non-transitory computer readable medium including computer program instructions, which when executed by a computer cause the computer to perform the method of claim 13.

15. A server, comprising:
a detector configured to detect pre-buffering of video content by a video buffer associated with a first video content player based on an icon corresponding to the video content, and
detect playback using the first video content player of the video content including a first plurality of images to be displayed at respective display times;
a receiver configured to receive an indication of purchase data;
a transmitter configured to send via an interface, payment option data corresponding to the video content, and in response to the indication of purchase data, to send instructions, which when executed from electronic memory,
after the beginning of the playback of the video content in the first video content player,
detect metadata of the video content, the metadata identifying an internet-delivered video replaying application environment,
launch the identified internet-delivered video replaying application environment in response to the detection of the metadata, and
load a second video content player provided in the identified internet-delivered video replaying application environment, and
to send data allowing the transfer of control of the playback of the video content from the first video content player to the second video content player such that a second plurality of images instructed to be displayed by the second video content player are displayed at respective display times and a first image of the second plurality of images instructed to be displayed by the second video content player and a last image of the first plurality of images displayed by the first video content player are sequential images in the video content, wherein
the second video content player is configured to use the video buffer associated with the first video content player to continue playback of the video content.

\* \* \* \* \*

UNITED STATES PATENT AND TRADEMARK OFFICE
CERTIFICATE OF CORRECTION

PATENT NO. : 10,674,226 B2  
APPLICATION NO. : 15/559437  
DATED : June 2, 2020  
INVENTOR(S) : Nigel Stuart Moore Page 1 of 1

It is certified that error appears in the above-identified patent and that said Letters Patent is hereby corrected as shown below:

On the Title Page

Item (73), the second Assignee's name is incorrect. Item (73) should read:
-- (73): Assignees: Sony Corporation, Tokyo (JP); Sony Europe B.V., Weybridge (GB) --

Signed and Sealed this  
Third Day of November, 2020

Andrei Iancu  
*Director of the United States Patent and Trademark Office*